(12) United States Patent
Yu

(10) Patent No.: US 11,104,329 B2
(45) Date of Patent: Aug. 31, 2021

(54) PARKING CONTROL METHOD AND APPARATUS, AND STORAGE MEDIUM

(71) Applicant: BAIDU ONLINE NETWORK TECHNOLOGY (BEIJING) CO., LTD., Beijing (CN)

(72) Inventor: Hao Yu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 49 days.

(21) Appl. No.: 16/727,827

(22) Filed: Dec. 26, 2019

(65) Prior Publication Data

US 2020/0211392 A1 Jul. 2, 2020

(30) Foreign Application Priority Data

Dec. 29, 2018 (CN) .......................... 201811638548.3

(51) Int. Cl.
*B60W 30/06* (2006.01)
*G05D 1/02* (2020.01)
(Continued)

(52) U.S. Cl.
CPC .......... *B60W 30/06* (2013.01); *B62D 15/0285* (2013.01); *G05D 1/0214* (2013.01);
(Continued)

(58) Field of Classification Search
CPC ............ B60W 30/06; B60W 2050/046; B62D 15/0285; G05D 1/0214; G08G 1/168; G08G 1/147; G08G 1/20
See application file for complete search history.

(56) References Cited

U.S. PATENT DOCUMENTS

2012/0089294 A1\* 4/2012 Fehse ..................... B62D 1/286
 701/25
2015/0353080 A1\* 12/2015 Mukaiyama ............ E05B 77/54
 701/23
(Continued)

FOREIGN PATENT DOCUMENTS

CN 102407848 A 4/2012
CN 103373349 A 10/2013
(Continued)

OTHER PUBLICATIONS

Chinese Patent Application No. 201811638548.3 Office Action dated Mar. 13, 2020, 5 pages.
(Continued)

*Primary Examiner* — Dale W Hilgendorf
(74) *Attorney, Agent, or Firm* — Lathrop GPM LLP

(57) ABSTRACT

The embodiments of the present disclosure disclose a parking control method, a parking control apparatus, and a storage medium. The method includes: if a current vehicle meets an automatic parking condition at a current location in a current parking lot, acquiring a safety perceptual data and a function perceptual data of the current vehicle by a safety sensor and a function sensor respectively; and controlling the current vehicle to move from the current location in the current parking lot to a target location in the current parking lot, according to the safety perceptual data and the function perceptual data of the current vehicle.

9 Claims, 3 Drawing Sheets

(51) Int. Cl.
  *G08G 1/16* (2006.01)
  *B62D 15/02* (2006.01)
  *B60W 50/04* (2006.01)
  *G08G 1/14* (2006.01)
  *G08G 1/00* (2006.01)
(52) U.S. Cl.
  CPC ....... *G08G 1/168* (2013.01); *B60W 2050/046* (2013.01); *G08G 1/147* (2013.01); *G08G 1/20* (2013.01)

(56) References Cited

U.S. PATENT DOCUMENTS

| | | | |
|---|---|---|---|
| 2017/0084179 A1* | 3/2017 | Chen | G01S 15/87 |
| 2017/0132482 A1* | 5/2017 | Kim | B60K 35/00 |
| 2017/0293464 A1* | 10/2017 | Braun | G06F 21/84 |
| 2018/0165962 A1 | 6/2018 | Neystadt et al. | |
| 2019/0079512 A1* | 3/2019 | Necker | B60K 37/06 |
| 2019/0202446 A1* | 7/2019 | Golgiri | G01C 21/165 |
| 2019/0371175 A1* | 12/2019 | Joos | G08G 1/14 |
| 2020/0192352 A1* | 6/2020 | Rastoll | G01S 17/86 |

FOREIGN PATENT DOCUMENTS

| | | |
|---|---|---|
| CN | 203318408 U | 12/2013 |
| CN | 105946853 A | 9/2016 |
| CN | 106985815 A | 7/2017 |
| CN | 107600067 A | 1/2018 |
| CN | 108482366 A | 9/2018 |
| CN | 108698516 A | 10/2018 |
| CN | 208164973 U | 11/2018 |
| CN | 108928343 A | 12/2018 |
| CN | 109017768 A | 12/2018 |
| DE | 102018001866 A1 | 7/2018 |
| EP | 3165425 A1 | 5/2017 |
| JP | 2007030564 A | 2/2007 |

OTHER PUBLICATIONS

Chinese Patent Application No. 201811638548.3 English translation of Office Action dated Mar. 13, 2020, 8 pages.
European Patent Application No. 19219739.0 extended Search and Opinion dated May 7, 2020, 9 pages.
Chinese Patent Application No. 201811638548.3 Second Office Action dated Oct. 26, 2020, 7 pages.
Chinese Patent Application No. 201811638548.3 English translation of Second Office Action dated Oct. 26, 2020, 8 pages.
Li, J et al., The Automotive PEPS System Based on Functional Safety, Agricultural Equipment & Vehicle Engineering, vol. 52, No. 4, Apr. 2014, 5 pages.

* cited by examiner

PARKING CONTROL METHOD AND APPARATUS, AND STORAGE MEDIUM

CROSS-REFERENCE TO RELATED APPLICATION

The present application is based upon and claims priority to Chinese Patent Application No. 201811638548.3, filed on Dec. 29, 2018, the entire contents of which are incorporated herein by reference.

TECHNICAL FIELD

The present disclosure relates to the field of unmanned vehicle technologies, and more particularly, to a parking control method, a parking control apparatus, and a storage medium.

BACKGROUND

Currently, cars have become one of the most important means for travel. Road congestion in China is also reflected in parking, especially in first-tier cities. Parking takes up a lot of time and affects the efficiency of travel. In addition, the behavior of parking is full of uncertainty, and is related to emotions. When a large number of vehicles to be parked in the parking lot are waiting in line, it often causes confusion and crowding, which disrupts normal parking order. Existing automatic parking system achieves automatic parking by the built-in function of the automobile itself, for example, the function of route planning of the vehicle by using the ultrasonic sensor to perceive dynamic environment such as surrounding parking spots, pedestrians and vehicles.

In the existing parking control method, automatic parking is usually realized by an ultrasonic sensor, so that only the safety level ASIL-B (Automotive Safety Integrity Level B) of the vehicle safety integrity level can be achieved, rather than the safety level ASIL-D (Automotive Safety integrity Level D). The existing parking control method requires personnel to participate in the entire parking process in or outside the vehicle, which does not guarantee the safety of parking, and also increases the complexity of parking.

SUMMARY

Embodiments of the present disclosure provide a parking control method, a parking control apparatus, and a storage medium.

Embodiments of the present disclosure provide a parking control method. The method includes: if a current vehicle meets an automatic parking condition at a current location in a current parking lot, acquiring a safety perceptual data and a function perceptual data of the current vehicle by a safety sensor and a function sensor respectively; and controlling the current vehicle to move from the current location in the current parking lot to a target location in the current parking lot, according to the safety perceptual data and the function perceptual data of the current vehicle.

Embodiments of the present disclosure provide a parking control apparatus, including: one or more processors; a memory storing instructions executable by the one or more processors; in which the one or more processors are configured to: acquire a safety perceptual data and a function perceptual data of a current vehicle by a safety sensor and a function sensor respectively when the current vehicle meets an automatic parking condition at a current location in a current parking lot; and control the current vehicle to move from the current location in the current parking lot to a target location in the current parking lot according to the safety perceptual data and the function perceptual data of the current vehicle.

Embodiments of the present disclosure provide a storage medium having a computer program stored thereon, in which when the program is executed by a processor, a parking control method according to any embodiment of the present disclosure is implemented. The method may include: if a current vehicle meets an automatic parking condition at a current location in a current parking lot, acquiring a safety perceptual data and a function perceptual data of the current vehicle by a safety sensor and a function sensor respectively; and controlling the current vehicle to move from the current location in the current parking lot to a target location in the current parking lot, according to the safety perceptual data and the function perceptual data of the current vehicle.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only some but not all structures related to the present disclosure are illustrated in the accompanying drawings.

Embodiment 1

Figure 1:
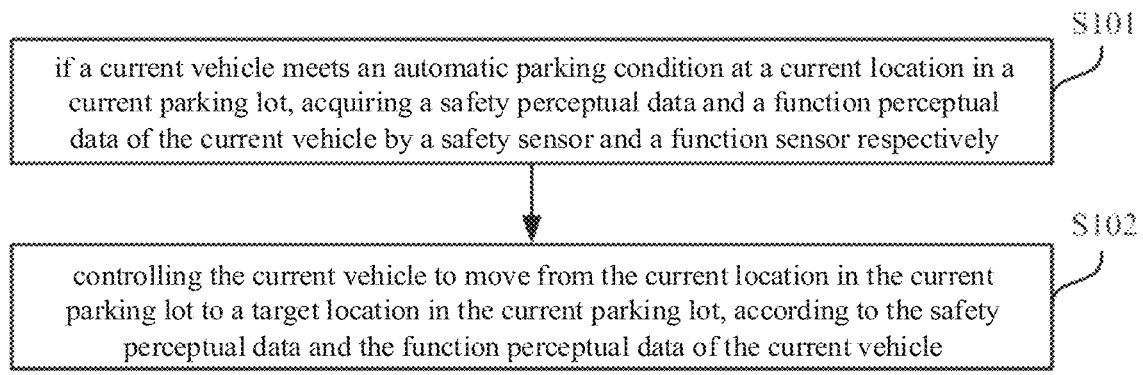
FIG. 1 is a flowchart of a parking control method according to Embodiment 1 of the present disclosure.

FIG. 1 is a flowchart of a parking control method according to Embodiment 1 of the present disclosure. The method may be implemented by a parking control apparatus or an electronic device, which may be implemented by software and/or hardware, and the apparatus or electronic device may be integrated in any intelligent device having network communication functionality. As shown in FIG. 1, the parking control method may include the following acts.

At step 101, if a current vehicle meets an automatic parking condition at a current location in a current parking lot, a safety perceptual data and a function perceptual data of the current vehicle are acquired by a safety sensor and a function sensor respectively.

In some embodiments, if the current vehicle meets the automatic parking condition at a current location in the current parking lot, the safety perceptual data and the function perceptual data of the current vehicle are acquired by the safety sensor and the function sensor in an electronic device respectively. Specifically, the safety sensor includes a collision sensor and an ultrasonic sensor. The function sensor includes a global positioning system (GPS) sensor and a fisheye sensor. The safety perceptual data includes a collision perceptual data and an ultrasonic perceptual data. The function perceptual data includes GPS perceptual data and fisheye perceptual data. Therefore, if the current vehicle meets the automatic parking condition at the current location in the current parking lot, the electronic device may acquire the collision perceptual data by the collision sensor, acquire the ultrasonic perceptual data by the ultrasonic sensor, acquire the GPS perceptual data by the GPS sensor, and acquire the fisheye perceptual data by the fisheye sensor.

At step 102, the current vehicle is controlled to be moved from the current location in the current parking lot to a target location in the current parking lot, according to the safety perceptual data and the function perceptual data of the current vehicle.

In some embodiments, the electronic device can control the current vehicle to move from the current location in the current parking lot to the target location in the current parking lot, according to the safety perceptual data and the function perceptual data of the current vehicle. Specifically, the electronic device may determine a collision control information of the current vehicle in a parking process from the current location to the target location according to the safety perceptual data of the current vehicle, determine a driving control information of the current vehicle in a parking process from the current location to the target location according to the safety perceptual data and the function perceptual data of the current vehicle, and then control the current vehicle to move from the current location in the current parking lot to the target location according to the collision control information and the driving control information.

With the parking control method, if a current vehicle meets the automatic parking condition at a current location in a current parking lot, a safety perceptual data and a function perceptual data of the current vehicle are acquired by a safety sensor and a function sensor respectively. The current vehicle is controlled to be moved from the current location in the current parking lot to a target location in the current parking lot, according to the safety perceptual data and the function perceptual data of the current vehicle. That is, in the technical solution of the present disclosure, the vehicle may be controlled to be moved from the current location in the current parking lot to the target location in the current parking lot, according to the safety perceptual data and the function perceptual data of the current vehicle. In the existing parking control method, automatic parking is usually realized by an ultrasonic sensor, so that only the safety level ASIL-B of the vehicle safety integrity level can be achieved, rather than the safety level ASIL-D. The existing parking control method requires personnel to participate in the entire parking process in or outside the vehicle, which not only does not guarantee the safety of parking, but also increases the complexity of parking. Therefore, compared to the prior art, the parking control method, the parking control apparatus, the electronic device and the storage medium provided by the embodiments of the present disclosure not only improve the parking safety, but also reduce the complexity of parking. Moreover, the technical solution of the present disclosure is simple, convenient to implement, easy to popularize, and has a wider applicability scope.

Embodiment 2

Figure 2:
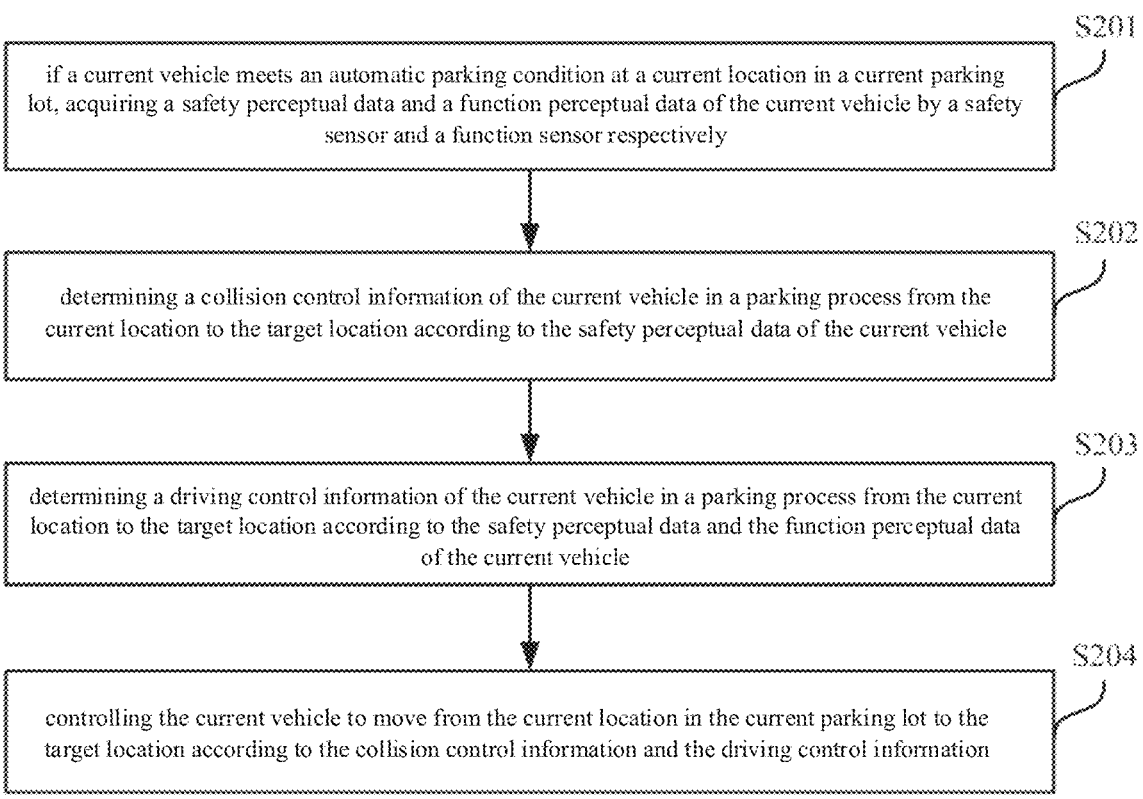
FIG. 2 is a flowchart of a parking control method according to Embodiment 2 of the present disclosure.

FIG. 2 is a flowchart of a parking control method according to Embodiment 2 of the present disclosure. As illustrated in FIG. 2, the method includes the following acts.

At step 201, if a current vehicle meets an automatic parking condition at a current location in a current parking lot, a safety perceptual data and a function perceptual data of the current vehicle are acquired by a safety sensor and a function sensor respectively.

In some embodiments, if the current vehicle meets the automatic parking condition at a current location in the current parking lot, the safety perceptual data and the function perceptual data of the current vehicle are acquired by the safety sensor and the function sensor in an electronic device respectively. Specifically, the safety sensor includes a collision sensor and an ultrasonic sensor. The function sensor includes a global positioning system (GPS) sensor and a fisheye sensor. The safety perceptual data includes a collision perceptual data and an ultrasonic perceptual data. The function perceptual data includes a GPS perceptual data and a fisheye perceptual data. Therefore, if the current vehicle meets the automatic parking condition at a current location in the current parking lot, the electronic device may acquire the collision perceptual data by the collision sensor, the ultrasonic perceptual data by the ultrasonic sensor, the GPS perceptual data by the GPS sensor, and the fisheye perceptual data by the fisheye sensor.

At step 202, a collision control information of the current vehicle in a parking process from the current location to a target location is determined according to the safety perceptual data of the current vehicle.

In some embodiments, the electronic device may determine the collision control information of the current vehicle in a parking process from the current location to the target location according to the safety perceptual data of the current vehicle. Specifically, the electronic device may transmit the collision perceptual data collected by the collision sensor and the ultrasonic perceptual data collected by the ultrasonic sensor to a first control panel of an ASIL-D safety level, and determine the collision control information by the first control panel according to the collision perceptual data and the ultrasonic perceptual data.

At step 203, a driving control information of the current vehicle in a parking process from the current location to the target location is determined according to the safety perceptual data and the function perceptual data of the current vehicle.

In some embodiments, the electronic device may determine the driving control information of the current vehicle in a parking process from the current location to the target location according to the safety perceptual data and the function perceptual data of the current vehicle. Specifically, the electronic device transmits the collision perceptual data collected by the collision sensor, the ultrasonic perceptual data collected by the ultrasonic sensor, the GPS perceptual data collected by the GPS sensor, and the fisheye perceptual data collected by the fisheye sensor to a second control panel of an ASIL-B safety level, and determines the driving control information by the second control panel according to the collision perceptual data, the ultrasonic perceptual data, the GPS perceptual data, and the fisheye perceptual data.

At step 204, the current vehicle is controlled to move from the current location to the target location according to the collision control information and the driving control information.

In some embodiments, the electronic device can control the current vehicle to move from the current location to the target location according to the collision control information and the driving control information. Specifically, the electronic device controls the current vehicle to be moved from the current location to the target location according to the driving control information, while keeping the vehicle at a certain distance away from ambient obstacles in a parking process from the current location to a target location according to the collision control information, such that collisions between the vehicle and the ambient obstacles may be avoided.

With the parking control method, if a current vehicle meets the automatic parking condition at a current location in a current parking lot, a safety perceptual data and a function perceptual data of the current vehicle are acquired by a safety sensor and a function sensor respectively. The current vehicle is controlled to be moved from the current location in the current parking lot to a target location in the current parking lot, according to the safety perceptual data and the function perceptual data of the current vehicle. That is, in the technical solution of the present disclosure, the vehicle may be controlled to move from the current location in the current parking lot to the target location in the current parking lot, according to the safety perceptual data and the function perceptual data of the current vehicle. In the existing parking control method, automatic parking is usually realized by an ultrasonic sensor, so that only the safety level ASIL-B of the vehicle safety integrity level can be achieved, rather than the safety level ASIL-D. The existing parking control method requires personnel to participate in the entire parking process in or outside the vehicle, which not only does not guarantee the safety of parking, but also increases the complexity of parking. Therefore, compared to the prior art, the parking control method, the parking control apparatus, the electronic device and the storage medium provided by the embodiments of the present disclosure not only improve the parking safety, but also reduce the complexity of parking. Moreover, the technical solution of the present disclosure is simple, convenient to implement, easy to popularize, and has a wider applicability scope.

Embodiment 3

Figure 3:
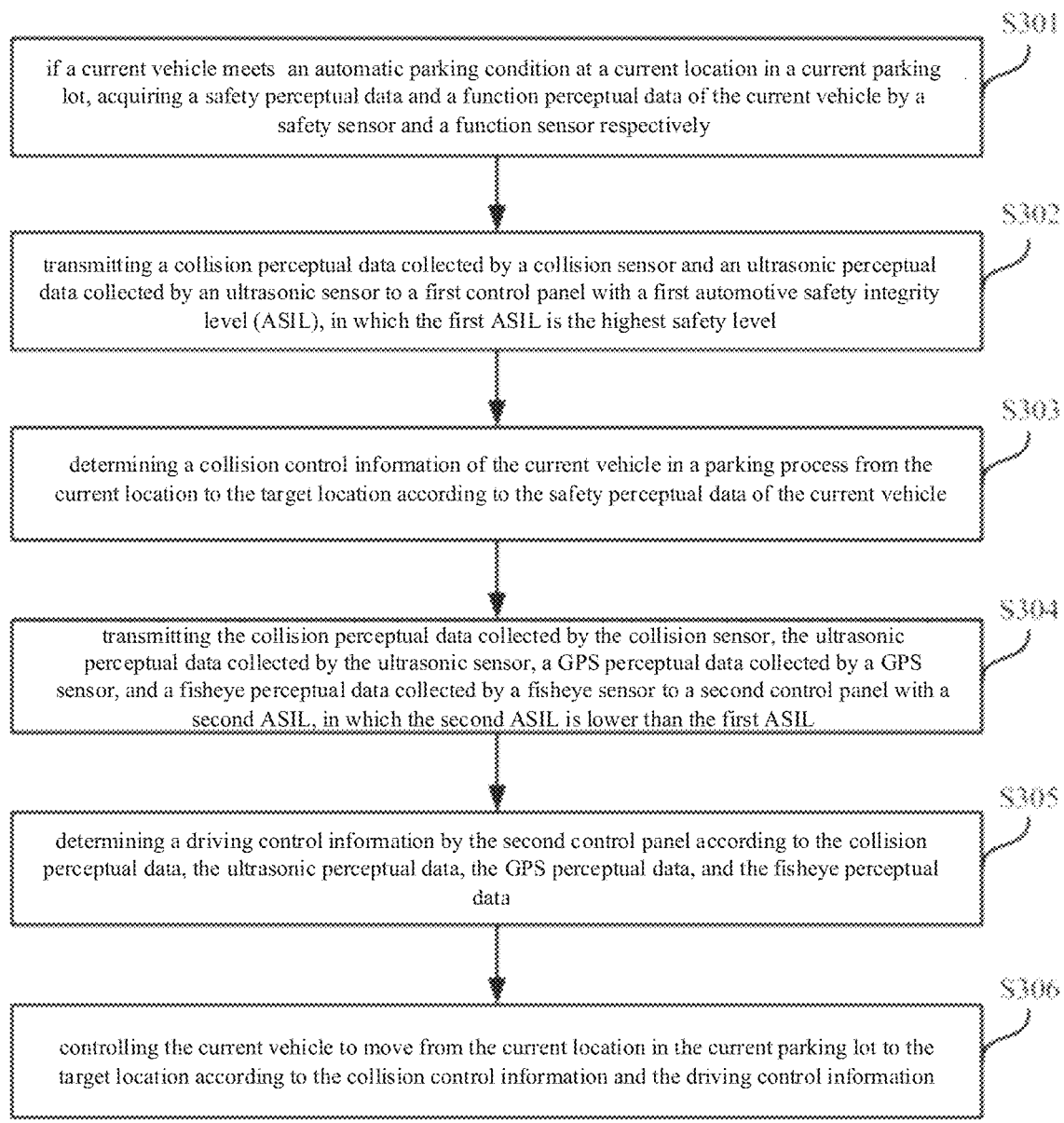
FIG. 3 is a flowchart of a parking control method according to Embodiment 3 of the present disclosure.

FIG. 3 is a flowchart of a parking control method according to Embodiment 3 of the present disclosure. As illustrated in FIG. 3, the method includes the following acts.

At step 301, if a current vehicle meets an automatic parking condition at a current location in a current parking lot, a safety perceptual data and a function perceptual data of the current vehicle are acquired by a safety sensor and a function sensor respectively.

In some embodiments, if the current vehicle meets the automatic parking condition at a current location in the current parking lot, the safety perceptual data and the function perceptual data of the current vehicle are acquired by the safety sensor and the function sensor in an electronic device respectively. Specifically, the safety sensor includes a collision sensor and an ultrasonic sensor. The function sensor includes a global positioning system GPS sensor and a fisheye sensor. The safety perceptual data includes a collision perceptual data and an ultrasonic perceptual data. The function perceptual data includes a GPS perceptual data and a fisheye perceptual data. Therefore, if the current vehicle meets the automatic parking condition at a current location in the current parking lot, the electronic device may acquire the collision perceptual data by the collision sensor, the ultrasonic perceptual data by the ultrasonic sensor, the GPS perceptual data by the GPS sensor, and the fisheye perceptual data by the fisheye sensor.

At step 302, a collision perceptual data collected by a collision sensor and an ultrasonic perceptual data collected by an ultrasonic sensor are transmitted to a first control panel with a first automotive safety integrity level (ASIL), in which the first ASIL is the highest safety level.

In the prior art, the automotive safety integrity levels include four levels in sequence: ASIL-A, ASIL-B, ASIL-C, and ASIL-D, in which ASIL-A is the lowest safety level and ASIL-D is the highest safety level. In some embodiments, the electronic device may transmit the collision perceptual data collected by the collision sensor and the ultrasonic perceptual data collected by the ultrasonic sensor to the first control panel with the ASIL-D safety level. Specifically, the electronic device may transmit the collision perceptual data collected by the collision sensor to a first input port of the first control panel, and transmit the ultrasonic perceptual data collected by the ultrasonic sensor to a second input port of the first control panel. The first input port and the second input port of the first control panel may be the same data input port, or may be different data input ports.

At step 303, a collision control information is determined by the first control panel according to the collision perceptual data and the ultrasonic perceptual data.

In some embodiments, the electronic device may determine the collision control information by the first control panel according to the collision perceptual data and the ultrasonic perceptual data. Specifically, after the electronic transmits the collision perceptual data collected by the collision sensor and the ultrasonic perceptual data collected by the ultrasonic sensor to the first control panel, the first control panel may determine the collision control information according to the collision perceptual data and the ultrasonic perceptual data, and transmit the determined collision control information back to the electronic device.

At step 304, the collision perceptual data collected by the collision sensor, the ultrasonic perceptual data collected by the ultrasonic sensor, the GPS perceptual data collected by the GPS sensor, and the fisheye perceptual data collected by the fisheye sensor are transmitted to a second control panel with a second ASIL, in which the second ASIL is lower than the first ASIL.

In some embodiments, the electronic device transmits the collision perceptual data collected by the collision sensor, the ultrasonic perceptual data collected by the ultrasonic sensor, the GPS perceptual data collected by the GPS sensor, and the fisheye perceptual data collected by the fisheye sensor to the second control panel with the ASIL-B safety level. Specifically, the electronic device may transmit the collision perceptual data collected by the collision sensor to a first input port of the second control panel, the ultrasonic perceptual data collected by the ultrasonic sensor to a second input port of the second control panel, the GPS perceptual data collected by the GPS sensor to a third input port of the second control panel, and the fisheye perceptual data collected by the fisheye sensor to a fourth input port of the second control panel. The first input port, the second input port, the third input port, and the fourth input port of the second control panel may be the same data input port, or may be different data input ports.

At step 305, a driving control information is determined via the second control panel according to the collision perceptual data, the ultrasonic perceptual data, the GPS perceptual data, and the fisheye perceptual data.

In some embodiments, the electronic device may determine the driving control information by the second control panel according to the collision perceptual data, the ultrasonic perceptual data, the GPS perceptual data, and the fisheye perceptual data. Specifically, after the electronic device transmits the collision perceptual data collected by the collision sensor, the ultrasonic perceptual data collected by the ultrasonic sensor, the GPS perceptual data collected by the GPS sensor, and the fisheye perceptual data collected by the fisheye sensor to the second control panel, the second control panel may determine the driving control information according to the collision perceptual data, the ultrasonic perceptual data, the GPS perceptual data, and the fisheye perceptual data, and transmit the determined driving control information back to the electronic device.

At step 306, the current vehicle is controlled to be moved from the current location to the target location according to the collision control information and the driving control information.

In some embodiments, the electronic device may control the current vehicle to move from the current location to the target location according to the collision control information and the driving control information. Specifically, the electronic device may control the current vehicle to move from the current location to the target location according to the driving control information, while keeping the vehicle at a certain distance away from ambient obstacles in a parking process from the current location to a target location according to the collision control information, such that collisions between the vehicle and the ambient obstacles may be avoided.

With the parking control method, if a current vehicle meets the automatic parking condition at a current location in a current parking lot, a safety perceptual data and a function perceptual data of the current vehicle are acquired by a safety sensor and a function sensor respectively. The current vehicle is controlled to move from the current location in the current parking lot to a target location in the current parking lot, according to the safety perceptual data and the function perceptual data of the current vehicle. That is, in the technical solution of the present disclosure, the vehicle may be controlled to move from the current location in the current parking lot to the target location in the current parking lot, according to the safety perceptual data and the function perceptual data of the current vehicle. In the existing parking control method, automatic parking is usually realized by an ultrasonic sensor, so that only the safety level ASIL-B of the vehicle safety integrity level can be achieved, rather than the safety level ASIL-D. The existing parking control method requires personnel to participate in the entire parking process in or outside the vehicle, which not only does not guarantee the safety of parking, but also increases the complexity of parking. Therefore, compared to the prior art, the parking control method, the parking control apparatus, the electronic device and the storage medium provided by the embodiments of the present disclosure not only improve the parking safety, but also reduce the complexity of parking. Moreover, the technical solution of the present disclosure is simple, convenient to implement, easy to popularize, and has a wider applicability scope.

Embodiment 4

Figure 4:
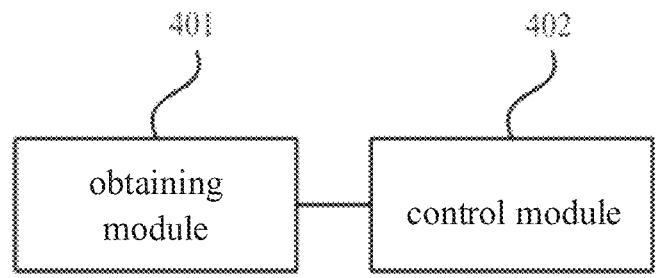
FIG. 4 is a first schematic diagram of a parking control apparatus according to Embodiment 4 of the present disclosure.

FIG. 4 is a first schematic diagram of a parking control apparatus according to Embodiment 4 of the present disclosure. As illustrated in FIG. 4, the parking control apparatus includes an obtaining module 401, and a control module 402.

The obtaining module 401 is configured to acquire a safety perceptual data and a function perceptual data of a current vehicle by a safety sensor and a function sensor respectively, if the current vehicle meets the automatic parking condition at a current location in a current parking lot.

The control module 402 is configured to control the current vehicle to move from the current location in the current parking lot to a target location in the current parking lot, according to the safety perceptual data and the function perceptual data of the current vehicle.

The safety sensor includes a collision sensor and an ultrasonic sensor. The function sensor includes a global positioning system GPS sensor and a fisheye sensor. The safety perceptual data includes a collision perceptual data and an ultrasonic perceptual data. The function perceptual data includes a GPS perceptual data and a fisheye perceptual data.

Figure 5:
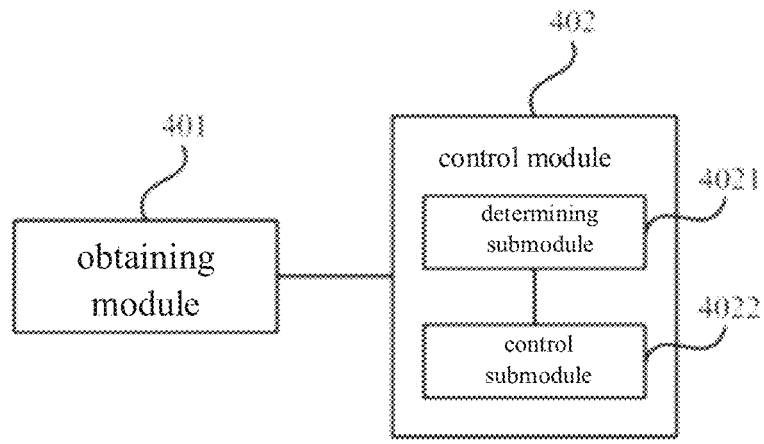
FIG. 5 is a second schematic diagram of a parking control apparatus according to Embodiment 4 of the present disclosure.

FIG. 5 is a second schematic diagram of a parking control apparatus according to Embodiment 4 of the present disclosure. As illustrated in FIG. 5, the control module 402 includes a determining submodule 4021 and a control submodule 4022.

The determining submodule 4021 is configured to determine a collision control information of the current vehicle in a parking process from the current location to the target location according to the safety perceptual data of the current vehicle; and determine a driving control information of the current vehicle in a parking process from the current location to the target location according to the safety perceptual data and the function perceptual data of the current vehicle.

The control submodule 4022 is configured to control the current vehicle to move from the current location in the current parking lot to a target location according to the collision control information and the driving control information.

Moreover, the determining submodule 4021 is configured to transmit the collision perceptual data collected by the collision sensor and the ultrasonic perceptual data collected by the ultrasonic sensor to a first control panel with a first automotive safety integrity level (ASIL), in which the first ASIL is the highest safety level, and to determine the collision control information via the first control panel according to the collision perceptual data and the ultrasonic perceptual data.

Furthermore, the determining submodule 4021 is configured to transmit the collision perceptual data collected by the collision sensor, the ultrasonic perceptual data collected by the ultrasonic sensor, the GPS perceptual data collected by the GPS sensor, and the fisheye perceptual data collected by the fisheye sensor to a second control panel with a second ASIL, in which the second ASIL is lower than the first ASIL, and to determine the driving control information via the second control panel according to the collision perceptual data, the ultrasonic perceptual data, the GPS perceptual data, and the fisheye perceptual data.

The parking control apparatus described above may implement the parking control method according to any embodiment of the present disclosure, and has a function module and a beneficial effect corresponding to the execution method. For the technical details that are not described in detail in this embodiment, reference may be made to the parking control method according to any embodiment of the present disclosure.

Embodiment 5

Figure 6:
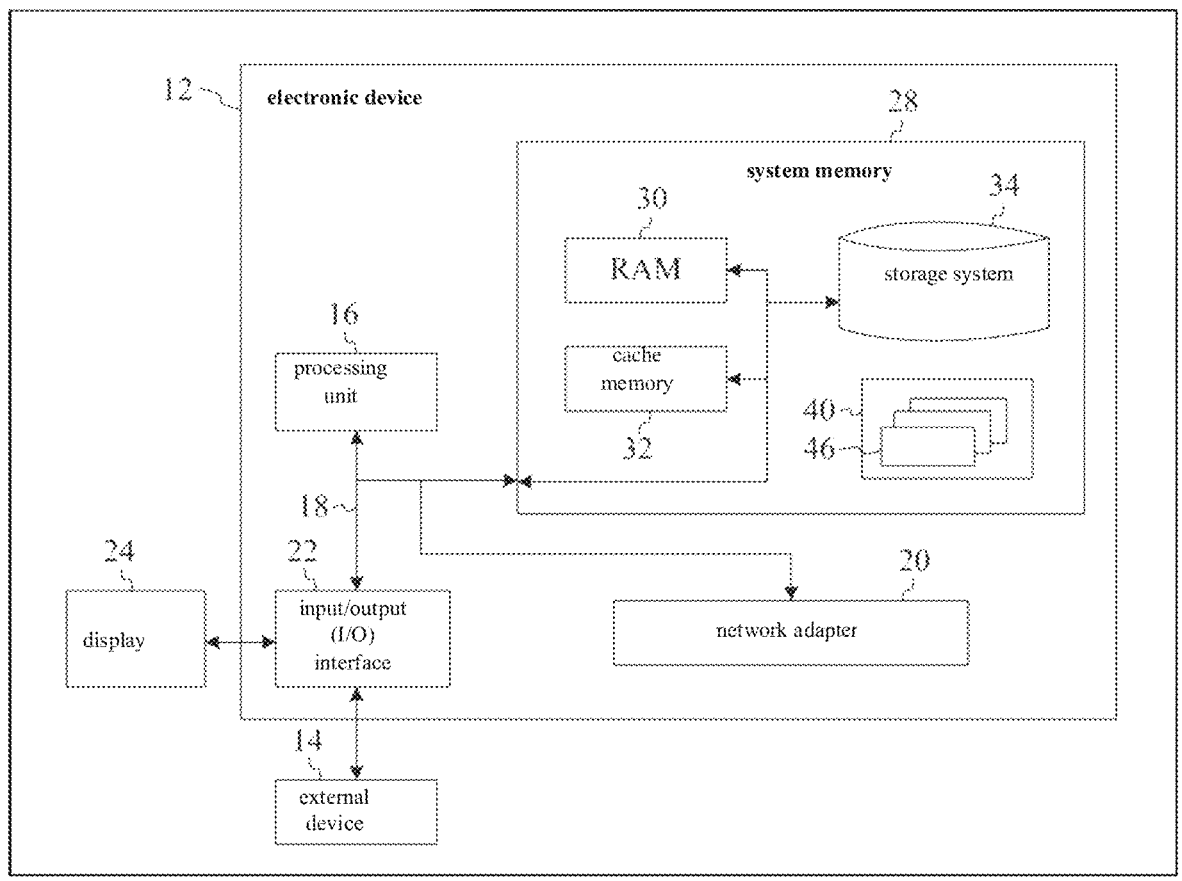
FIG. 6 is a schematic diagram of an electronic device according to Embodiment 5 of the present disclosure.

FIG. 6 is a schematic diagram of an electronic device according to Embodiment 5 of the present disclosure. FIG. 6 is also a block diagram of an exemplary electronic device suitable for use in implementing embodiments of the present disclosure. The electronic device 12 shown in FIG. 6 is merely an example and should not impose any limitation on the function and scope of use of the embodiments of the present disclosure.

As shown in FIG. 6, the electronic device 12 is represented in the form of a general purpose computing server. The components of the electronic device 12 may include, but are not limited to, one or more processors or processing units 16, a system memory 28, and a bus 18 that connects different system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The electronic device 12 typically includes a variety of computer system readable medium. These medium may be any available medium accessible by the electronic device 12 and includes both volatile and non-volatile media, removable and non-removable media.

The system memory 28 may include a computer system readable medium in the form of volatile memory, such as a random access memory (hereinafter referred to as RAM) 30 and/or a cache memory 32. The electronic device 12 may further include other removable or non-removable, volatile or non-volatile computer system storage media. By way of example only, the storage system 34 may be configured to read and write a non-removable and non-volatile magnetic media (not shown in FIG. 6, commonly referred to as a "hard drive"). Although not shown in FIG. 6, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

The programs/utilities 40 having a set of (at least one of) program modules 46, which may be stored, for example, in the system memory 28, such program modules 46 include, but is not limited to, operating systems, one or more applications, other program modules, and program data. Implementations of the network environment may be included in each or some combination of the examples. The program module 46 typically performs the functions and/or methods of the described embodiments of the present disclosure.

The electronic device 12 can also be in communication with one or more external devices 14 (e.g., a keyboard, a pointing device, a display 24, etc.), and can also be in communication with one or more devices that enable a user to interact with the electronic device 12, and/or communicate with any device (e.g., a network card, a modem, etc.) that enables the electronic device 12 to communicate with one or more other computing devices. This communication can take place via an input/output (I/O) interface 22. Moreover, the electronic device 12 can also communicate with one or more networks (e.g., a local area network (LAN), a wide area network (WAN), and/or a public network, such as the Internet) through a network adapter 20. As shown, the network adapter 20 communicates with other modules of the electronic device 12 via the bus 18. It should be understood that although not shown in the figures, other hardware and/or software modules may be utilized in combination with the electronic device 12, including but not limited to: microcode, device drivers, redundant processing units, external disk drive arrays, redundant arrays of independent disks (RAID) systems, tape drives, and data backup storage systems.

The processing unit 16 executes various functional applications and data processing by running a program stored in the system memory 28, for example, for implementing the parking control method in the embodiments of the present disclosure.

Embodiment 6

Embodiment 6 of the present disclosure also provides a storage medium.

The above storage medium including the computer executable instructions may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media includes (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a combination thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object: oriented programming language, such as Java®, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims

What is claimed is:

1. A parking control method, comprising:
   if a current vehicle meets an automatic parking condition at a current location in a current parking lot, acquiring a safety perceptual data and a function perceptual data of the current vehicle by a safety sensor and a function sensor respectively; and
   transmitting the safety perceptual data collected by the safety sensor to a first control panel with a first automotive safety integrity level (ASIL), and transmitting the safety perceptual data collected by the safety sensor and the function perceptual data collected by the function sensor to a second control panel with a second ASIL, in which the first ASIL is the highest safety level and the second ASIL is lower than the first ASIL;
   receiving collision control information from the first control panel and driving control information from the second control panel; and
   controlling the current vehicle to move from the current location in the current parking lot to a target location in the current parking lot according to the collision control information and driving control information.

2. The method according to claim 1, wherein the safety sensor comprises a collision sensor and an ultrasonic sensor; the function sensor comprises a global positioning system (GPS) sensor and a fisheye sensor; the safety perceptual data comprises a collision perceptual data collected by the collision sensor and an ultrasonic perceptual data collected by the ultrasonic sensor; and the function perceptual data comprises a GPS perceptual data collected by the GPS sensor and a fisheye perceptual data collected by the fisheye sensor.

3. The method according to claim 2, wherein
   the collision control information is determined via the first control panel according to the collision perceptual data and the ultrasonic perceptual data.

4. The method according to claim 3,
   the driving control information is determined via the second control panel according to the collision perceptual data, the ultrasonic perceptual data, the GPS perceptual data, and the fisheye perceptual data.

5. A parking control apparatus, comprising:
   one or more processors;
   a memory storing instructions executable by the one or more processors;
   wherein the one or more processors are configured to:
   acquire a safety perceptual data and a function perceptual data of a current vehicle by a safety sensor and a function sensor respectively if the current vehicle meets an automatic parking condition at a current location in a current parking lot; and
   transmit the safety perceptual data collected by the safety sensor to a first control panel with a first automotive safety integrity level (ASIL), and to transmit the safety perceptual data collected by the safety sensor and the function perceptual data collected by the function sensor to a second control panel with a second ASIL, in which the first ASIL is the highest safety level and the second ASIL is lower than the first ASIL;
   receive collision control information from the first control panel and driving control information from the second control panel; and
   control the current vehicle to move from the current location in the current parking lot to a target location in the current parking lot, according to the collision control information and the driving control information.

6. The apparatus according to claim 5, wherein the safety sensor comprises a collision sensor and an ultrasonic sensor; the function sensor comprises a global positioning system (GPS) sensor and a fisheye sensor; the safety perceptual data comprises a collision perceptual data collected by the collision sensor and an ultrasonic perceptual data collected by the ultrasonic sensor; and the function perceptual data comprises a GPS perceptual data collected by the GPS sensor and a fisheye perceptual data collected by the fisheye sensor.

7. The apparatus according to claim 5, wherein the collision control information is determined via the first control panel according to the collision perceptual data and the ultrasonic perceptual data.

8. The apparatus according to claim 7, wherein the driving control information is determined via the second control panel according to the collision perceptual data.

9. A non-transitory storage medium having a computer program stored thereon, wherein when the program is executed by a processor, a parking control method is implemented, and the parking control method comprises:
   if a current vehicle meets an automatic parking condition at a current location in a current parking lot, acquiring a safety perceptual data and a function perceptual data of the current vehicle by a safety sensor and a function sensor respectively; and
   transmitting the safety perceptual data collected by the safety sensor to a first control panel with a first automotive safety integrity level (ASIL), and transmitting the safety perceptual data collected by the safety sensor and the function perceptual data collected by the function sensor to a second control panel with a second ASIL, in which the first ASIL is the highest safety level and the second ASIL is lower than the first ASIL;
   receiving collision control information from the first control panel and driving control information from the second control panel; and
   controlling the current vehicle to move from the current location in the current parking lot to a target location in the current parking lot according to the collision control information and driving control information.

* * * * *